Figure 8:
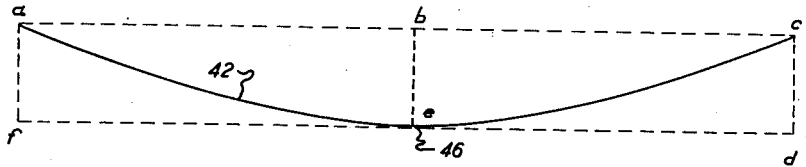

Feb. 13, 1945.   O. HEHN   2,369,143
PROJECTION SCREEN
Filed July 23, 1941   4 Sheets-Sheet 1
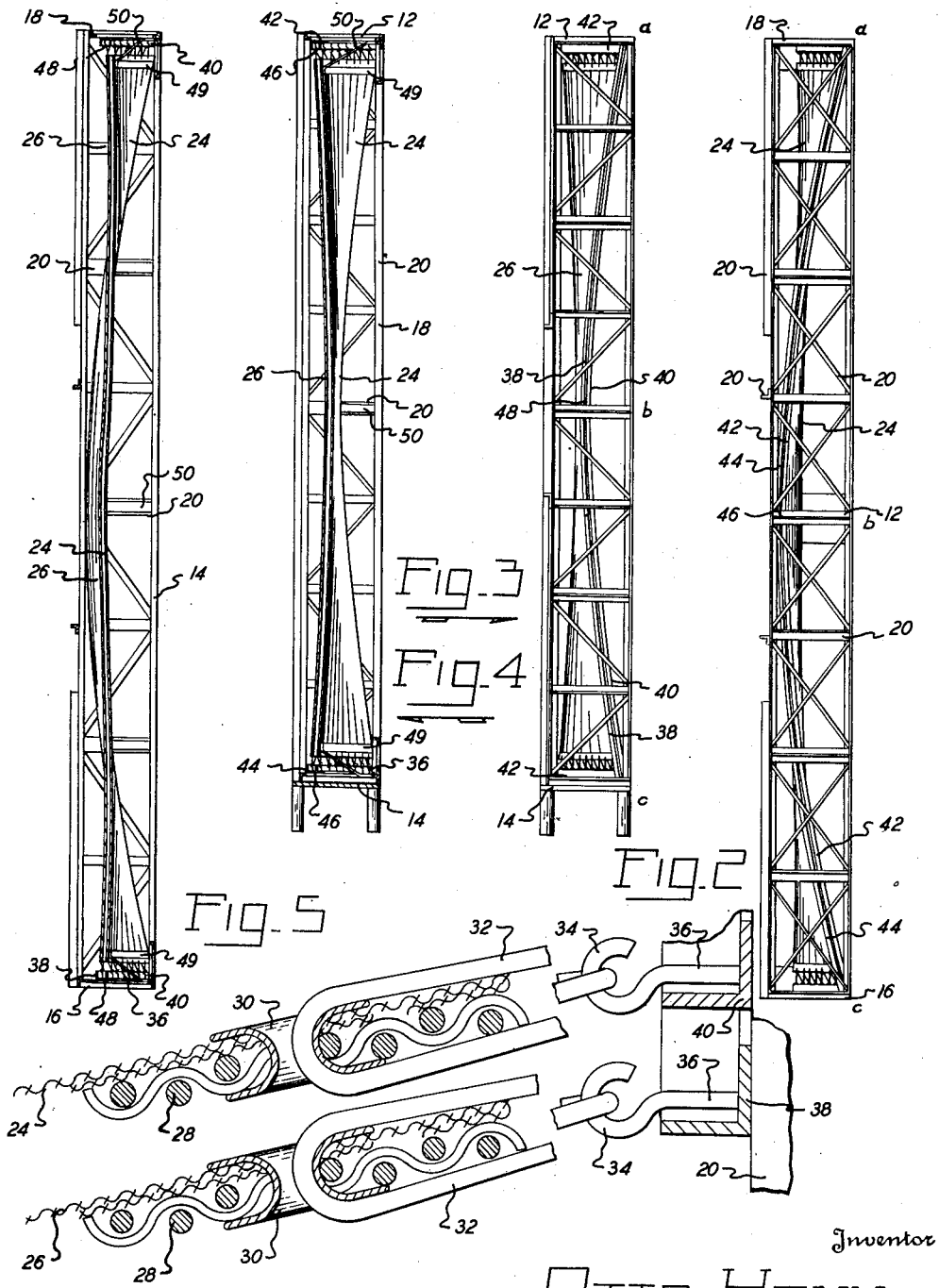
Inventor
OTTO HEHN
By Beaman & Langford
Attorney Inventor
OTTO HEHN
By Beaman & Langford
Attorney Feb. 13, 1945. O. HEHN 2,369,143
PROJECTION SCREEN
Filed July 23, 1941 4 Sheets-Sheet 3

Inventor
OTTO HEHN
By Beaman & Langford
Attorney

Feb. 13, 1945. O. HEHN 2,369,143
PROJECTION SCREEN
Filed July 23, 1941 4 Sheets-Sheet 4
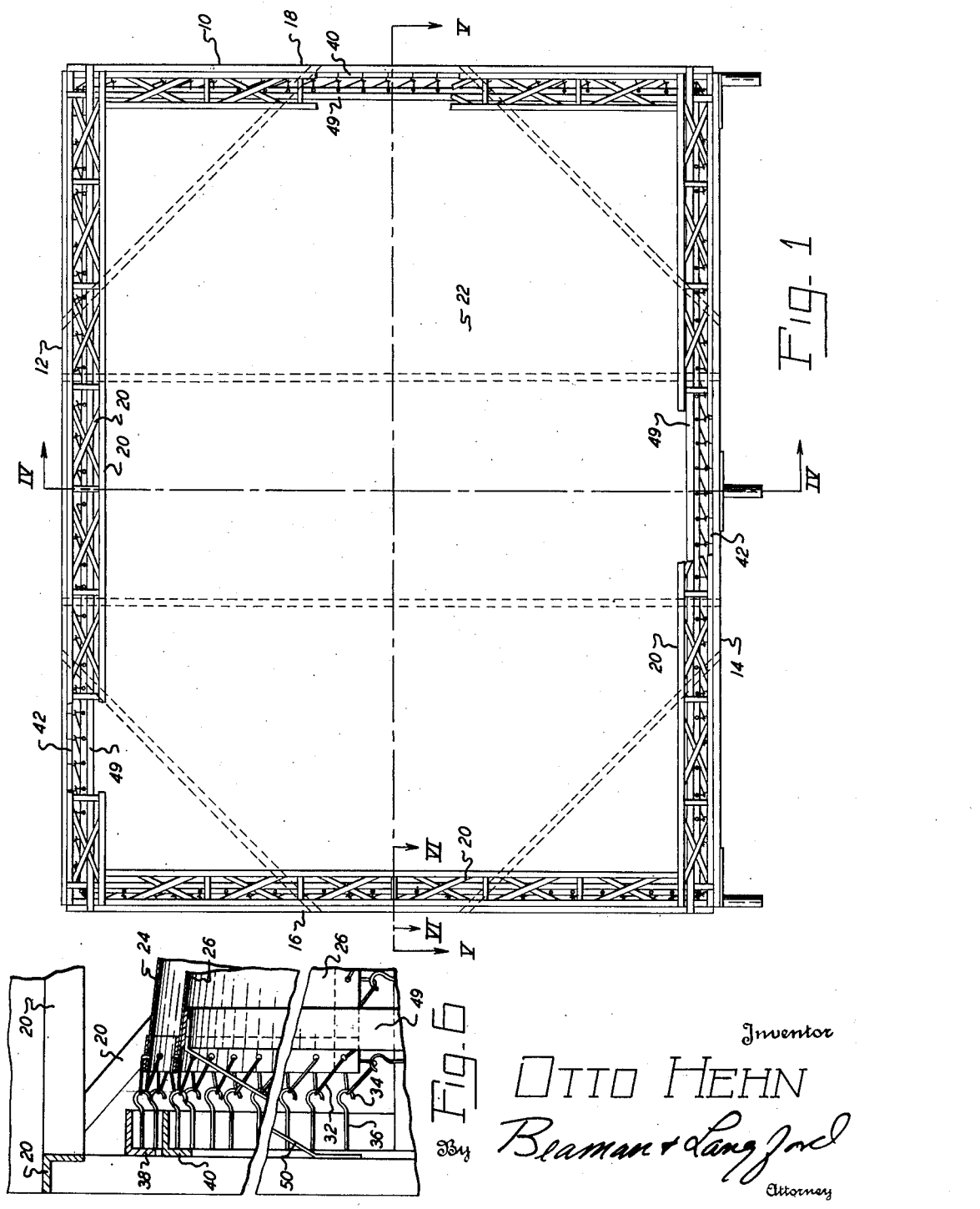

Patented Feb. 13, 1945

2,369,143

UNITED STATES PATENT OFFICE 2,369,143

PROJECTION SCREEN

Otto Hehn, Jackson, Mich., assignor to The Sparks-Withington Company, Jackson, Mich., a corporation of Ohio Application July 23, 1941, Serial No. 403,676

8 Claims. (Cl. 88—28.90)

The present invention relates to an apparatus for reproducing images by illumination, being particularly concerned with screens used in connection with the projection of motion pictures, television and the like, and of forms other than flat.

In theater and home projection of the motion picture, the flat screen has from the conception of the motion picture industry continued to be the only form of screen that has been used in practice. Experimental screens of other forms have made their appearance from time to time, but have not been adapted. Also, in the patented art is found numerous proposals of screen forms, all having as their expressed object improvements over the flat screen.

The principal objections to the flat screen for reproducing images by illumination in theaters result from the practical necessity of seating the audience, generally speaking, within a segment of 90° or less of an imaginary circle, with the screen at the center and the sides of the theater corresponding to diverging radii. The projection of the image upon the screen from an angle which may vary from 0° to 30° or more provides further complications. It is only necessary to observe the area in which an experienced adult audience in a partly filled theater will arrange itself to appreciate the objectionable feature of the flat screen. Such an audience will be concentrated as near to the projection beam as available seats permit and at a distance of fifty feet or more from the screen, depending upon the screen size. Optical fatigue and the offensive distortion experienced from the seats at the front and sides of the theater places the practical seating capacity of the theater materially below the actual seating capacity.

In developing a screen capable of increasing the practical seating capacity of theaters now using flat screens, it also has been possible to provide a screen which lends an increased impression of naturalness to the projected images through the suggestion of perspective and relief. While there is no contention that there is any stereoscopical effect, it is the opinion of most observers of my screen that it produces a depth effect, as compared to the impression of "flatness" of the conventional screen.

The principles of the screen design of the present invention are applicable over a sufficient range as to enable the screens to be designed for installation in existing theaters, including those having extreme projection angles and extreme stage widths. As will be more fully described hereinafter, a correction factor is provided to compensate for all projection angles other than 0°. In practice, screens embodying the principles of the present invention have been found satisfactory including projection angles as high as 34°.

In general, my improved screen comprises surfaces of suitable material developed by the tensioning of flexible sheets in frameworks or the equivalent with the forms of surfaces being developed through marginal tensioning along predetermined paths. In practice the framework and flexible sheet are of rectangular shape and for convenience of description reference will be made to the path along which the sheet is tensioned as located along the top, bottom and sides of the rectangle. It is not my purpose, however, to restrict the principle of the present invention to rectangular shaped screens.

For a specific consideration of a screen constructed in accordance with the principles of the present invention, it is advisable to set forth at this point certain definitions. For example, the base plane of the screen is a vertical plane in which the corners of the rectangular sheet and/or its tensioning structure are disposed or substantially so. In practice, this will correspond substantially to the vertical plane of the front of the framework. The angle of projection is the angle the axis of the lens of the projection machine takes with reference to a horizontal plane passing through the center of the screen. For example, with 0° projection angle, the lens axis will lie in this horizontal plane. Top, bottom and side depths of the screens are the maximum distances the marginal portions of the sheet, and/or its tensioning structure, are disposed rearwardly of the vertical base plane of the screen.

In my experimental work upon many screens, I have found that the desired characteristics heretofore discussed can be obtained by tensioning a flexible sheet upon a suitable rectangular framework, wherein the top and bottom marginal portion of the sheet are tensioned along paths having a depth at their center points in the order of 6% to 16% of the length of the screen, and the vertical sides of the sheet are tensioned along paths having a depth at their center points in the order of 4.5% to 12% of the height of the screen. With projecting angles in the order of 0°, the preferred ratio of top and bottom depth to length is in the order of 1 to 8, while the preferred ratio of the side depth to height is in the order of 1 to 12.

The desired shape of the screen is controlled by the shape of the paths along which marginal edges are tensioned. These paths in practice may be most conveniently constructed as curves with the culmination point of the curves at the mid-points of the top, bottom and side sections of the screen and its frame portion. The marginal portion of the flexible sheet, and/or its tensioning means are preferably disposed along these paths. However, it is possible that the marginal portion and/or the tensioning means may be extended beyond the marginal top, bottom and sides of the screen proper, in which event the paths in question would be defined by intersection of top, bottom and side marginal planes of the screen with the surfaces of the tensioned flexible sheet, these marginal planes being normal to the vertical base plane of the screen.

Figure 9:
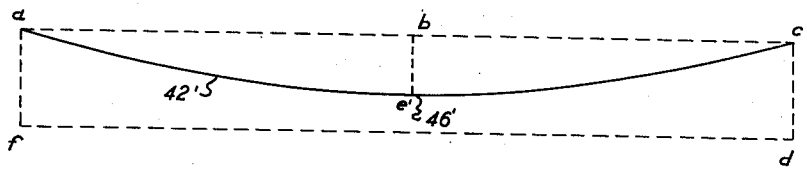
Figure 10:
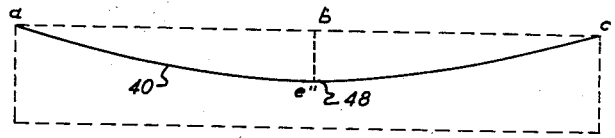
Figure 11:
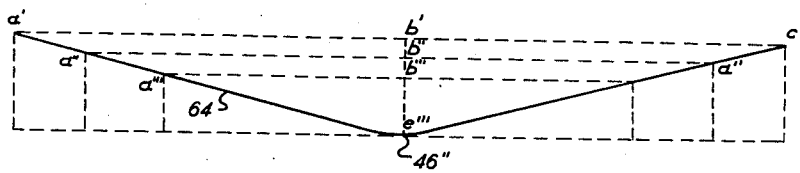
Figure 12:
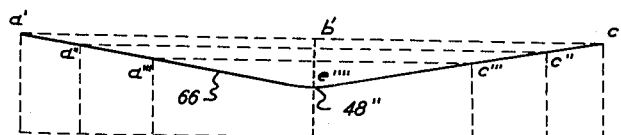
Figures 13, 14:
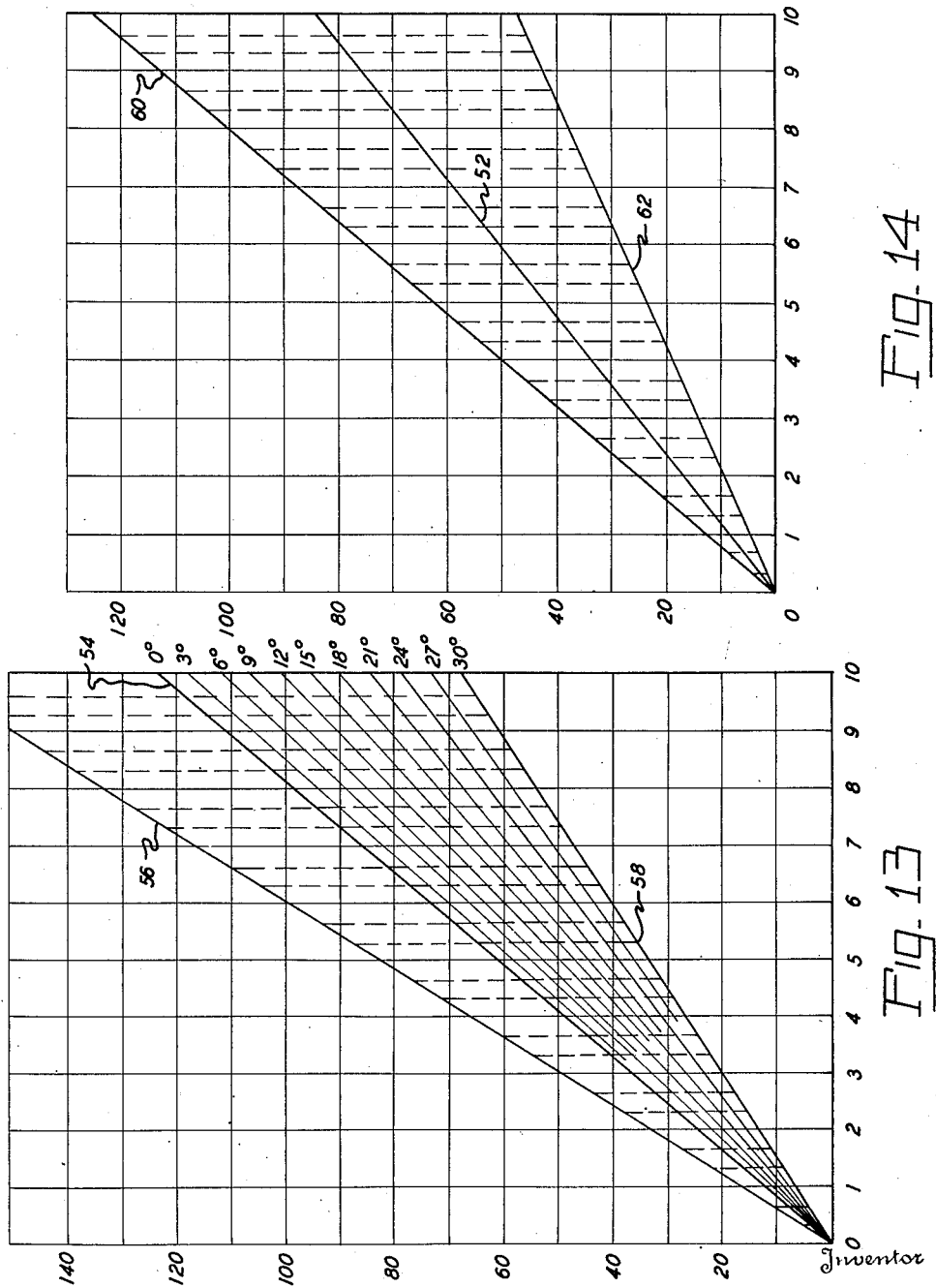

In order to more fully describe the principles of construction of my improved screen, I have illustrated in the accompanying drawings a form of framework capable of producing screens having the desired characteristics heretofore set forth, wherein Fig. 1 is a front elevational view of the screen and its framework, partly shown in broken section, Fig. 2 is a top view of Fig. 1, Fig. 3 is an end view of Fig. 1, Fig. 4 is a vertical cross-sectional view taken on line IV—IV of Fig. 1, Fig. 5 is a horizontal cross-sectional view taken on line V—V of Fig. 1, Fig. 6 is an enlarged fragmentary section taken on lines VI—VI of Fig. 1, Fig. 7 is an enlarged fragmentary view of the marginal edge and tension means for the flexible sheets, Fig. 8 is a diagrammatic layout of a typical top and bottom marginal curve with 0° projection angle, Fig. 9 is a diagrammatic layout of a typical top and bottom marginal curve with 26° projection angle, Fig. 10 is a diagrammatic layout of a typical side marginal curve, Figs. 11 and 12 present another method of determining the tops, bottoms, and sides marginal paths along which the marginal edges of the screen are tensioned, Fig. 13 is a chart for determining the culmination point of the top and bottom margin paths of the flexible sheet, showing the preferred form as well as the range of the present invention, Fig. 14 is a chart for determining the culmination point of the side marginal path of the flexible sheet, showing the preferred form as well as the range of the present invention.

In Figs. 1 to 7 I have illustrated a screen 10 particularly designed to be used with sound equipment and capable of being "flown," that is, installed in theaters in which the screen is raised and lowered.

The screen 10 comprises a rigid framework having a top section 12, a bottom section 14, and side sections 16 and 18. In practice the framework is fabricated from steel channel members 20, welded or otherwise secured together into a rigid border structure within which the image receiving portion 22 of the screen 10 is tensioned to the desired shape.

As shown the image receiving portion 22 of the screen 10 takes the form of two slightly spaced screen sections 24 and 26, which may be of identical size and shape. To conform to the framework of the screen 10, the sections 24 and 26 are likewise substantially rectangular, and may be of any suitable flexible material capable of being firmly tensioned. For example, the sections 24 and 26 may be of woven glass fabric as disclosed in my copending application Serial No. 378,119, filed February 10, 1941 now Patent No. 2,346,257. Referring to Figs. 6 and 7, in particular, the selvage edges of the fabric sections 24 and 26 are reinforced at 28 to receive the grummets 30. Lacing 32 running through the grummets 30 and the loops 34 of the hooks 36 tension the fabric sections 24 and 26 to the framework of the screen 10. As shown, the hooks 36 are secured in the frame sections 16 and 18 to the members 38 and 40, which define the marginal paths along which the vertical sides of the fabric sections 24 and 26 are tensioned, the members 38 and 40 being equally spaced throughout their entire extent. In a similar manner the members 42 and 44 supported by the frame sections 12 and 14 carry additional hooks 36 and define the marginal path along which the top, bottom, and sides of the fabric sections 24 and 25 are tensioned. The hooks 36 should be closely spaced for the best results. From a consideration of Figs. 2 and 3, it will be seen that the members 38, 40, 42, and 44 defined paths which are concaved with respect to the vertical base plane abc of the screen 10. As the culmination point 46 of the members 42 and 44 at the top and bottom of the screen 10 are of greater depth than the culmination points 48 of the members 38 and 40 at the sides of the screen 10, upon tensioning the lacing 32 the fabric sections will assume the complex shapes of Figs. 2 and 5. In practice the depth of the culmination point 46 with reference to the vertical base plane abc of the screen 10 will usually determine the depth of the framework sections 12, 14, 16, and 18.

In developing screens having the characteristics heretofore mentioned, it was of commercial importance that the desired effects be secured through the use of marginal paths, along which the fabric sections 24 and 26 are tensioned, that could be easily determined thus facilitating the manufacture of screens of different sizes. I have found in practice that if the members 38, 40, 42, and 44 define catenary curves of the specified culmination points satisfactory results are obtained. For example, the curvature of the members 42 and 44 may be readily defined through the use of an extremely thin strip of wood supported at its ends in the plane abc at the corners of the framework with its culmination point at 46. The curvature of the members 38 and 40 may be obtained in a similar manner.

As more clearly shown in Fig. 6, metal bands 49 conforming to the curvature of the members 38, 40, 42 and 44 bear against the marginal edges of the fabric section 24 to aid in the smooth tensioning of the image surface. Suitable brackets 50 support the bands 49 upon the framework.

It is considered advisable to state at this point that the disclosure of a screen made from two fabric sections 24 and 26 has been done merely to have the specification conform to the commercial construction. The sections 24 and 26 are substantially identical in shape, being of open weave glass fabric. With a less porous surface, the rear screen section may be omitted. In the remaining specification and the annexed claims, the spaced screen sections 24 and 26 are considered as constituting a single image receiving surface. From another point of view, the rear fabric section 26 may be ignored, as its presence or absence has no bearing upon the principles of the present invention.

In Fig. 8 is shown a preferred layout of the curve of the member 42 at the top and bottom of the screen 10 with 0° projection angle. The dotted line rectangle represents the general outline of a horizontal cross section of the screen 10. As shown, the distance *abc* is six meters and the depth *be* of the culmination point 46 is 74 centimeters. The curve *aec* is generally that of a catenary.

Fig. 9 shows the correction that is made in the curve 42 of Fig. 8 with a projection angle of 26°, for example. Under such conditions, the catenary curve 42' has the depth *ae'* of the culmination 46' located at a distance of 45 centimeters.

From a consideration of the graph of Fig. 13, the manner in which the culmination point of the curve is determined will be readily understood. As the angle of projection is increased, it is necessary to reduce the depth of the curve at the top and bottom of the screen in order to avoid objectionable distortion of horizontal lines of the projected images, particularly with reference to titles which are photographed in two dimensions. Projection of pictures of three dimensional objects do not reveal to the observer any objectionable unnaturalness due to possible distortion of horizontal lines, with the degree of correction for projection angles appearing from the graph of Fig. 13. It is to be understood that the most nearly perfect results will be obtained with the improved screens when the projection angle is in the order of 0°.

In Fig. 10 is shown a layout of the curve of the member 40 with a screen height *abc* of 4.5 meters and a depth *be"* of the culmination point 48 and the side of the screen of 38 centimeters. In Fig. 14, the line 52 is preferably used in determining the culmination points at the sides of the screen. In the graph of Fig. 13, the line 54 on the 0° projection line would be preferably used in determining the culmination points at the top and bottom of the screen. It has been found, however, that the scope of the present invention embraces all screens falling within the shaped areas between the lines 56 and 58 of the graph of Fig. 13 and the shaped area between the lines 60 and 62 of the graph of Fig. 14.

In Figs. 11 and 12 I have shown another method of obtaining screen shapes or different size screens within the scope of the invention where you have projection angles in the order of 0° to 10°. The length of the screens are indicated by the distances *a'c'*, *a"c"*, *a'''c'''*, and the depth of the culmination points 46" by distances *b'e'''*, *b"e'''*, *b'''e'''* respectively. In Fig. 12, a similar arrangement is shown with reference to the depth of the culmination points 48" for the sides of the screen. As heretofore stated, the preferred depth of the culmination points at the top and bottom of the screen are in the order of 12% of the length with the depth of the culmination points at the sides in the order of 8% of the height. Accordingly, in Fig. 11, the distance *b'e'''* is approximately 12% of the length *a'c'* with the distance *b'e'''* of Fig. 12 approximately 8% of the distance *a'b'* of Fig. 12. It is also to be noted that the paths 64 and 66 are modified somewhat from the curves of Figs. 8 to 10 inclusive. Accordingly, it is to be understood that it is the depth of the culmination points and not the exact shape of the paths along which the marginal edges of the screen section are tensioned that is controlling, as long as a substantially regular image receiving surface is provided void of sharp changes in angularity.

I claim:

1. A screen of the type described comprising a rigid framework having upper, lower and side portions between which the image is received, a screen portion having an image receiving surface in the form of a pliable sheet having upper, lower and side edges, means for edgewise tensioning of said sheet secured to said edges, anchoring means for said means carried in said framework portions, said anchoring means commencing from points adjacent the corners of said framework and extending rearwardly along an arc to a culmination point at the central part of said portions, the depth of the culmination points of the upper and lower portions being in the order of 6% to 16% of the length and the depth of the culmination points of the sides in the order of 4.5% to 12% of the height.

2. A screen of the type described comprising a rigid framework having upper, lower and side portions between which the image is received, a screen portion having an image receiving surface in the form of a pliable sheet having upper, lower and side edges, means for edgewise tensioning of said sheet secured to said edges, anchoring means for said means carried in said framework portion, said anchoring means commencing from points adjacent the forward corners of said framework and extending rearwardly along an arc to a culmination point at the central part of said portions, the depth of the culmination points of the upper and lower portions being in the order of 12% of the length and the depth of the culmination points of the sides in the order of 8% of the height.

3. A screen of the type described comprising an image receiving surface of generally rectangular shape as viewed by the audience, the top, bottom and side marginal surface portions being concaved with respect to the audience and the central surface portions being slightly convex with respect to the audience with the marginal area of said central surface portion being relatively flat, the depth of the culmination points of the top and bottom edge portion of said receiving surface being in the order of 6% to 16% of the length of the screen, and the depth of the culmination point of the side edge portion of said receiving surface being in the order of 4.5% to 12% of the height.

4. A projection receiving screen having a substantially polygonal concave image receiving surface with the corners thereof disposed in substantially the same plane and with the upper and lower edges concaved along the substantially catenary curves in the order of 6% to 16% of the length and the side edges concaved along substantially catenary curves in the order of 4.5% to 12% of the height.

5. A projection screen comprising a sheet member of substantially rectangular outline having the four corners thereof disposed in substantially the same plane and with the upper and lower edges concaved along substantially catenary curves in the order of 6% to 16% of the length and the side edges concaved along substantially catenary curves in the order of 4.5% to 12% of the height.

6. A projection screen comprising a polygonal sheet member and means edgewise tensioning said sheet member with the four corners thereof in substantially the same plane and with the upper and lower edges between the corners concaved along substantially catenary curves in the order of 6% to 16% of the length and with the side edges concaved along substantially catenary curves in the order of 4.5% to 12% of the height.

7. A projection screen comprising a substantially rectangular woven pliant sheet having its longer axis substantially horizontal, and means edgewise tensioning said pliant sheet with the four corners thereof disposed in substantially the same plane and with the upper and lower edges concaved along substantially catenary curves in the order of 6% to 16% of the length, and the side edges concaved along substantially catenary curves in the order of 4.5% to 12% of the height.

8. A projection screen comprising a substantially rectangular pliant sheet, a substantially rectangular supporting frame structure, and means degewise tensioning said sheet member upon the supporting frame structure with the four corners thereof disposed in substantially the same plane and with the long edges concaved along substantially catenary curves in the order of 6% to 16% of the length and with the short edges concaved along substantially catenary curves in the order of 4.5% to 12% of the length of such edges.

OTTO HEHN.